(12) United States Patent
Mori et al.

(10) Patent No.: US 7,707,803 B2
(45) Date of Patent: May 4, 2010

(54) BIODEGRADABLE BAGS FOR PACKING FOODS AVAILABLE IN HIGH SPEED PRODUCTION

(75) Inventors: Hirotsugu Mori, Kyoto (JP); Yoshio Iwasaki, Shiga (JP); Yukio Kobayashi, Tokyo (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 12/365,066

(22) Filed: Feb. 3, 2009

(65) Prior Publication Data

US 2009/0142614 A1    Jun. 4, 2009

Related U.S. Application Data

(63) Continuation of application No. 10/467,116, filed as application No. PCT/JP02/00858 on Feb. 4, 2002.

(30) Foreign Application Priority Data

Feb. 5, 2001    (JP)    ............... 2001-028829

(51) Int. Cl.
  *B65B 9/00*     (2006.01)
  *B65B 3/02*     (2006.01)
(52) U.S. Cl. .......................... 53/450; 53/140
(58) Field of Classification Search .................. 53/140, 53/450, 545, 550, 551; 428/35.4, 35.9, 36.6, 428/36.7; 493/328, 330, 335
See application file for complete search history.

(56) References Cited

U.S. PATENT DOCUMENTS

| 4,272,944 A | * | 6/1981 | Suga ..................... 53/550 |
| 5,421,139 A | * | 6/1995 | Tolson ................... 53/450 |
| 5,540,035 A | * | 7/1996 | Plahm et al. ............ 53/551 |
| 5,548,946 A | * | 8/1996 | Holub ................... 53/550 |
| 5,679,421 A |   | 10/1997 | Brinton, Jr. |
| 5,755,082 A | * | 5/1998 | Takahashi et al. ........ 53/511 |
| 5,845,465 A | * | 12/1998 | Bennett ................ 53/551 |
| 5,895,723 A | * | 4/1999 | Utz .................... 428/480 |
| 6,153,276 A |   | 11/2000 | Oya et al. |
| 6,264,098 B1 |   | 7/2001 | Drummond et al. |
| 6,322,899 B1 |   | 11/2001 | Karhuketo et al. |
| 6,367,230 B1 | * | 4/2002 | Fukuda ................ 53/551 |

(Continued)

FOREIGN PATENT DOCUMENTS

DE    43 13 136    10/1994

(Continued)

*Primary Examiner*—Louis K Huynh
(74) *Attorney, Agent, or Firm*—Hogan & Hartson LLP

(57) ABSTRACT

A method for producing a biodegradable bag and for packing a food, such as a snack food, which is required to have an oxygen barrier property and a water vapor barrier property. The biodegradable bag can be produced at a high speed by a bag making and packaging machine, which can be degraded by naturally occurring microorganisms in soil or water finally to a non-hazardous degradation product, which can be biorecycled, and which is not accumulated in nature. The biodegradable bag for packing a food comprises a laminated film obtainable by laminating in the following order: a sealant layer comprising a biodegradable polymer; a barrier layer having an oxygen barrier property and a water vapor barrier property; and a barrier layer-supporting substrate layer comprising a biodegradable polymer, the laminated film being heat-sealed in order for the sealant layer to be inside.

8 Claims, 7 Drawing Sheets

U.S. PATENT DOCUMENTS

| | | | |
|---|---|---|---|
| 6,524,667 B1 * | 2/2003 | Colgan | 428/35.2 |
| 6,543,208 B1 * | 4/2003 | Kobayashi et al. | 428/36.7 |
| 2002/0127358 A1 * | 9/2002 | Berlin et al. | 428/36.6 |
| 2002/0150775 A1 * | 10/2002 | Ishikawa et al. | 428/458 |

FOREIGN PATENT DOCUMENTS

| | | |
|---|---|---|
| EP | 0 576 993 | 6/1993 |
| JP | 04298345 | 10/1992 |
| JP | 04352653 | 12/1992 |
| JP | 06255039 | 9/1994 |
| JP | 08252895 | 10/1996 |
| JP | 08-290526 | 11/1996 |
| JP | 08-323946 | 12/1996 |
| JP | 09-164626 | 6/1997 |
| JP | 10-100353 | 4/1998 |
| JP | 10146936 A | 6/1998 |
| JP | 10151715 | 6/1998 |
| JP | 3054197 | 9/1998 |
| JP | 2000264343 A | 9/2000 |
| JP | 2001-122288 | 5/2001 |
| JP | 2001180741 | 7/2001 |

* cited by examiner

BIODEGRADABLE BAGS FOR PACKING FOODS AVAILABLE IN HIGH SPEED PRODUCTION

CROSS-REFERENCE TO RELATED APPLICATIONS

This application is a continuation of application Ser. No. 10/467,116 filed Dec. 8, 2003, which is a national stage of international application No. PCT/JP02/00858 filed Feb. 4, 2002, the entire contents of both applications are incorporated herein by reference. This application also claims the benefit of priority under 35 USC 119 of Japanese Patent Application No. 2001-028829 filed Feb. 2, 2001, the entire content of which is incorporated herein by reference.

TECHNICAL FIELD

The present invention relates to a biodegradable bag for packing a food, for example for a snack food such as a potato chips especially which is required to have an oxygen barrier property and a water vapor barrier property.

BACKGROUND ART

A conventional package material for a snack food frequently has a 5-layer structure consisting of polypropylene resin layer/polyethylene resin layer/metal aluminum vapor deposition—biaxial oriented PET (polyethylene terephthalate) layer/polyethylene layer/biaxial oriented polypropylene resin layer in this order from the inside.

A polypropylene resin (PP) layer as the innermost layer serves as a sealant layer. For such an innermost layer, a polypropylene resin is selected since a low temperature heat seal ability and a hot tack property immediately after the heat sealing. The hot tack property is required because of a slightly pressurized packaging process conducted while inflating a bag with air or nitrogen for the purpose of preventing any damage on a snack food as a content in the bag. The thickness of the polypropylene resin layer as this innermost layer is frequently about 20 to 50 µm.

A metal aluminum vapor deposition layer serves to shield an external light and to prevent the permeation of oxygen and water vapor. It has a thickness of 300 to 1500 angstrom and is formed usually by a vapor deposition of a metal aluminum onto a biaxial oriented PET film or a polypropylene resin.

A biaxial oriented PET layer consists of a biaxial oriented polyethylene terephthalate (PET) film, which is a material onto which a metal aluminum can be deposited most stably and frequently has a thickness of about 12 µm.

A polyethylene resin (PE) layer serves as an adhesive for binding a biaxial oriented PET film with an outermost biaxial oriented polypropylene (OPP) film or for binding an innermost non-oriented polypropylene resin with a biaxial oriented PET film, and has a thickness of about 15 µm. The polyethylene resin layer sometimes employs an ethylene-(meth)acrylic acid copolymer, and the polyethylene resin layer is replaced sometimes with an urethane-based adhesive or an organic solvent-free monomer-containing adhesive.

A biaxial oriented polypropylene film as an outermost layer is brought into a direct contact with a heat sealing device (seal bar) at an elevated temperature, and serves to transmit the heat to the innermost polypropylene resin layer. It has a thickness of 15 to 25 µm.

A package material for a snack food having 4 to 5 layers as described above has a total thickness of 40 to 117 µm.

A method for fabricating a packaging material having the above mentioned layer construction may frequently, when taking a cost into consideration, involve a fabrication procedure in which a PET film is subjected to a vapor deposition with a metal aluminum, and then a PE (polyethylene) is extruded between the PET film vapor deposition side and the non-oriented polypropylene film to effect a lamination while extruding a PE between an OPP film and the PET film (the opposite side of the vapor deposition side) whereby effecting a lamination.

However, such a package structure poses an extreme difficulty in recycling the materials because of the combination of a diversity of materials such as polypropylene resins, PET resins, polyethylene resins and the like. In addition, a polypropylene resin forming an innermost layer adsorbs the flavors of a snack food, resulting in a deteriorated taste. A further disadvantage is that a total thickness as thick as about 40 to 120 µm makes it difficult to transmit a heat.

Recently, a demand of increasing the producibility leads to a demand of a higher speed of a bag making and packaging machine. In order to accomplish a high speed production, a heat seal should be accomplished within a shorter seal time, resulting naturally in a demand of a heat seal process at a high temperature within a short time for giving a certain calorie. Thus, a high seal temperature is required to give, within a shorter seal time, a calorie given over conventional seal time, but conventional bag material layer construction can not be sealed at a high temperature because of a small difference in the melting point between the outermost and the innermost layers.

On the other hand, such a plastic packaging material, which has been employed for a long time, now poses an waste disposal problem after being used. Generally, a plastic waste is collected as a refuse, which is then incinerated or dumped in the ground.

When incinerated, a conventional plastic packaging material consisting mainly of polyolefins gives a burning calorie as high as $4.2 \times 10^7$ J/kg or more, which leads to a high possibility of damaging a furnace, sometimes in combination with a possibility of emitting dioxins depending on the incineration temperature when containing chlorinated compounds, resulting in a controversy about the incineration itself.

When dumped in the ground, a polyolefin such as a polypropylene or polyethylene remains in the nature semi-permanently, resulting in a cause of an environmental pollution.

SUMMARY OF THE INVENTION

Under the circumstance described above, an object of the invention is to provide a biodegradable bag for packing a food capable of storing a food such as a snack food which is required to have an oxygen barrier property and a water vapor barrier property, which can be produced at a high speed by a bag making and packaging machine, which can be degraded by naturally occurring microorganisms in soil or water finally to a non-hazardous degradation product, which can be biorecycled, and which is not accumulated in nature.

Thus, the present invention is a biodegradable bag for packing a food, which comprises a laminated film obtainable by laminating in the following order; a sealant layer comprising a biodegradable polymer; a barrier layer having an oxygen barrier property and a water vapor barrier property; and a barrier layer-supporting substrate layer comprising a biodegradable polymer, said laminated films being heat-sealed in order for the sealant layer to be inside.

The sealant layer is preferably a non-oriented film comprising biodegradable polymer with the melting point of 120° C. or below, and is formed preferably by laminating a biodegradable polymer via an extrusion molding onto a barrier layer supported by a barrier layer-supporting substrate layer.

The barrier layer is formed preferably by means of a vapor deposition of a ceramic and/or a metal, and is preferably a single component vapor deposition layer comprising at least one selected from the group consisting of $SiO_x$, $Al_2O_3$ and Al, or a dual component vapor deposition layer consisting of at least one combination of two components selected from the group consisting of $SiO_x/Al_2O_3$, $SiO_x/ZnO$, $SiO_x/CaO$, $SiO_x/B_2O_3$ and $CaO/Ca(OH)_2$ and has a thickness of 1500 angstrom or less.

The barrier layer-supporting substrate layer is formed preferably by laminating a biodegradable polymer via an extrusion molding onto a paper substrate layer, and preferably comprises a biaxial oriented film of a biodegradable polymer, and more preferably comprises a biaxial oriented film of a biodegradable polymer with the melting point of 150° C. or higher.

The biodegradable bag for packing a food of the present invention preferably comprises a laminated film comprising a paper substrate layer made of a paper outside the barrier layer-supporting substrate layer. Such a biodegradable bag for packing a food can be obtainable by extruding a biodegradable polymer onto the paper substrate layer to effect a lamination whereby forming the barrier layer-supporting substrate layer, followed by effecting a vapor deposition of a ceramic and/or a metal onto the barrier layer-supporting substrate layer to form the barrier layer, followed by laminating the sealant layer via a biodegradable adhesive onto the barrier layer. It is also possible to produce such a biodegradable bag for packing a food by laminating a biaxial oriented film of a biodegradable polymer via a biodegradable adhesive onto the substrate layer whereby forming the barrier layer-supporting substrate layer, followed by effecting a vapor deposition of a ceramic and/or a metal onto the barrier layer-supporting substrate layer to form the barrier layer, followed by laminating the sealant layer via a biodegradable adhesive onto the barrier layer.

The biodegradable bag for packing a food of the present invention is preferable when the thickness of the sealant layer is 5 to 50 μm, the thickness of the barrier layer is 300 to 1500 angstrom, the thickness of the barrier layer-supporting substrate layer is 5 to 20 μm and the thickness of the paper substrate layer converted into a basis weight is 15 to 100 g/m².

The biodegradable bag for packing a food of the present invention preferably comprises a printed layer comprising a biodegradable ink outside the substrate layer.

The biodegradable bag for packing a food of the present invention preferably comprises a laminated film further comprising a print-protecting layer comprising a biodegradable polymer between the sealant layer and the barrier layer. Such a biodegradable bag for packing a food can be obtainable by effecting a vapor deposition of a ceramic onto the barrier layer-supporting substrate layer comprising a biaxial oriented film of a biodegradable polymer to form the barrier layer, followed by molding the print-protecting layer onto the barrier layer, followed by forming a printed layer onto the print-protecting layer, followed by laminating the sealant layer via a biodegradable adhesive onto the printed layer. Such a biodegradable bag for packing a food is preferable when the thickness of the sealant layer is 5 to 50 μm, the thickness of the print-protecting layer is 0.02 to 0.2 μm, the thickness of the barrier layer is 300 to 1500 angstrom, and the thickness of the barrier layer-supporting substrate layer is 5 to 20 μm.

The biodegradable bag for packing a food of the present invention which preferably further comprises an adhesive layer comprising a biodegradable adhesive between respective layers.

The biodegradable bag for packing a food of the present invention which is preferably used for packaging a snack food.

Also included in the present invention is a method for packing a food comprising a back seal step in which a laminated film in the following order; a sealant layer comprising a biodegradable polymer; a barrier layer having an oxygen barrier property and a water vapor barrier property; and a barrier layer-supporting substrate layer comprising a biodegradable polymer is made tubular with the sealant layer being inside to bring the both back sides into contact and heat-sealed with each other, a food introducing step in which a food is introduced to the inside of the tube of the laminated film, and an end seal step in which the both ends of the tube of the laminated film containing the food are heat-sealed.

Figure 1:
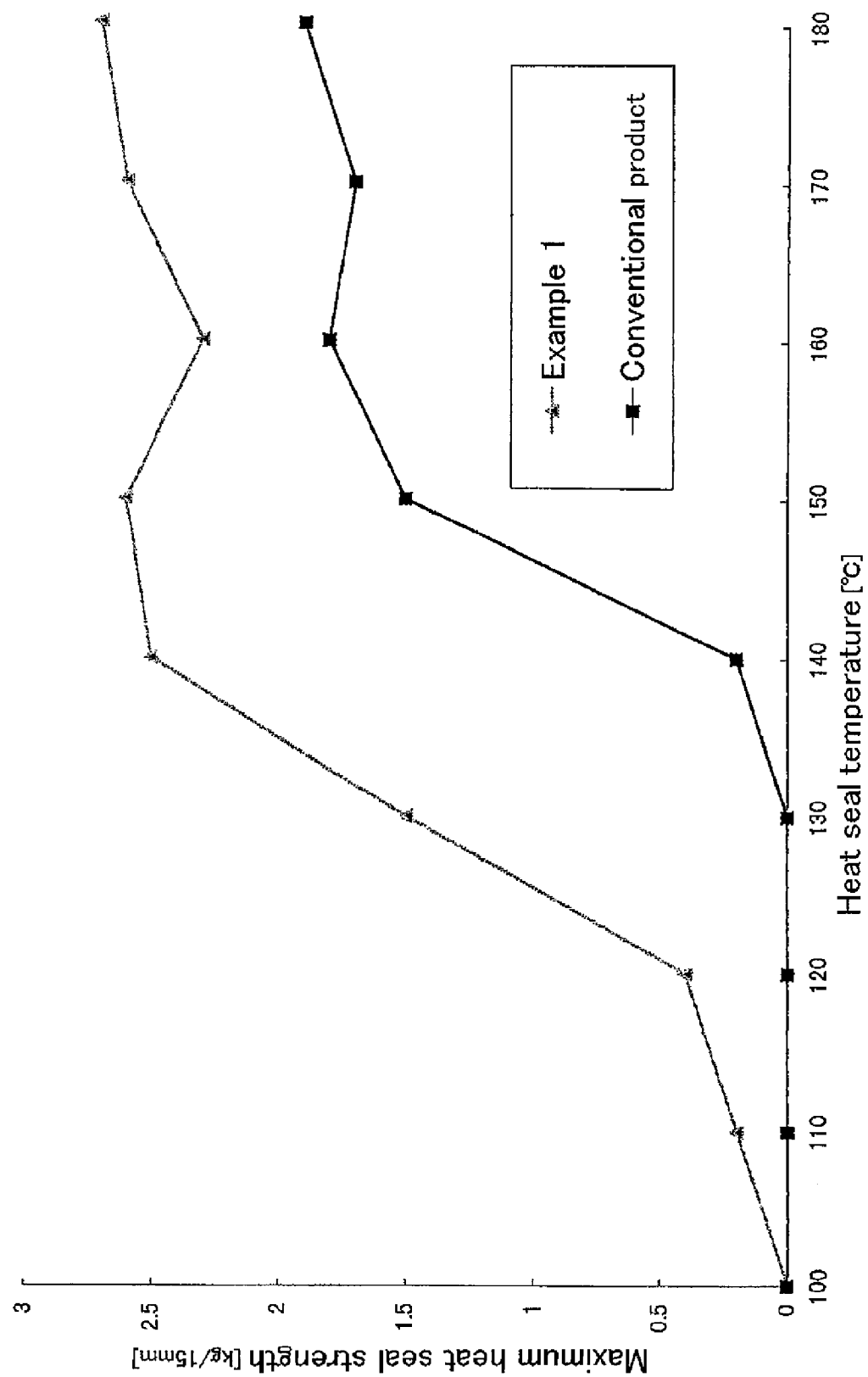
FIG. 1 shows the heat seal temperature property of the roll for a snack food bag in Example 1 (product of the invention) and a conventional roll film (conventional product).

In Figures, 1 is a sealant layer, 2 is an adhesive layer, 3 is a barrier layer, 4 is a barrier layer-supporting substrate layer, 5 is a paper substrate layer, 6 is a printed layer, 7 is a print-protecting layer, 8 is a back seal and 9 is an end seal.

DETAILED DISCLOSURE OF THE INVENTION

The present invention is detailed below.

A biodegradable bag for packing a food according to the present invention which comprises a laminated film obtainable by laminating in the following order; a sealant layer comprising a biodegradable polymer; a barrier layer having an oxygen barrier property and a water vapor barrier property and; a barrier layer-supporting substrate layer consisting of a biodegradable polymer.

The sealant layer comprises a biodegradable polymer.

The biodegradable polymer preferably has the melting point of 120° C. or below. The low melting point of 120° C. or below gives a compatibility with a high speed operation of the bag making and packaging machine. A temperature of 65° C. to 120° C. is more preferable.

Such a biodegradable polymer may be any of microorganism-derived polymers, naturally occurring polymers or chemically synthesized polymers, and those employed preferably are aliphatic polyester resins obtained by the polycondensation of aliphatic diols and aliphatic dicarboxylic acids. When using an aliphatic polyester resin, a polymer having a varying melting point can be obtained by altering the combination of an aliphatic diol and an aliphatic dicarboxylic acid employed.

The aliphatic dicarboxylic acid may for example be oxalic acid, malonic acid, succinic acid, adipic acid, glutaric acid, suberic acid, pimelic acid, sebacic acid, dodecane diacid compounds and the like, while the aliphatic diol may for example be ethylene glycol, diethylene glycol, triethylene glycol, propylene glycol, dipropylene glycol, 1,4-butanediol, 1,4-cyclohexane dimethanol and the like.

The aliphatic polyester resin is preferably a biodegradable aliphatic polyester resin having the melting point of about 95° C. obtained by using succinic acid and adipic acid as dicarboxylic acids and 1,4-butanediol as an aliphatic diol, such as a polybutylene succinate, polybutylene succinate adipate copolymer and the like. Any of them are commercially available as a biodegradable resin BIONOLLE (manufactured by SHOWA HIGHPOLYMER CO., LTD.), and the production method is disclosed for example in Japanese Kokai Publication Hei-4-189822 and Japanese Kokai Publication Hei-5-70575.

Otherwise, the aliphatic polyester resin is preferably a polyethylene succinate. This is commercially available as a biodegradable resin Lunare SE (manufactured by NIPPON SHOKUBAI CO., LTD.).

The sealant layer consists preferably of a non-extended film of a biodegradable polymer which was formed without any extension process and is substantially non-oriented. Generally, the extension of a plastic is conducted by stretching biaxial, i.e., longitudinally and widthwise at a temperature lower by 10 to 20° C. than the melting point while undergoing a heat fixation, and the resultant oriented film is imparted with the pliability, transparency, oxygen barrier property which are improved by about 3 times when compared with a non-oriented film, and such physical characteristics can be maintained up to the temperature of the heat fixation. Nevertheless, above this temperature, the orientation imparted in the extension step is disturbed, resulting in a shrinkage, which leads to a wrinkle at the heat seal part during the heat seal step, as well as a difficulty in accomplishing the heat seal step satisfactorily. A non-oriented film gives no such problems.

When the sealant layer is a non-oriented film layer comprising a biodegradable polymer, the sealant layer is formed preferably by laminating the biodegradable polymer onto a barrier layer-supporting substrate layer by means of an extrusion molding. This extrusion molding needs no adhesive.

The biodegradable polymer employed in the sealant layer preferably has hot tack and oil resistance, which may be imparted by incorporating additives to the polymer.

The laminated films are heat-sealed in order for the sealant layer to be inside, whereby being formed as a biodegradable bag for packing a food according to the present invention.

When an aliphatic polyester resin is employed in the sealant layer, the adsorption of the flavor of the content food can advantageously be avoided.

The thickness of the sealant layer is preferably 5 to 50 µm. A thickness less than 5 µm leads to an uneven thickness upon molding, resulting in difficulty in ensuring the thickness sufficient for the seal. In addition, a high pressure upon sealing causes a fluidity, which affects a sealing performance. On the other hand, a thickness more than 50 µm gives an increased overall thickness, which leads to an increased weight, which is problematic also in view of a container recycling law. Moreover, an increased overall thickness allows a pin hole to be formed readily upon sealing at the site of the crossing of the longitudinal and widthwise seals.

The barrier layer has an oxygen barrier property and the water vapor barrier property.

Such a barrier layer may be obtained for example by means of a vapor deposition of a ceramic and/or a metal. The barrier layer when providing a paper substrate layer outside the barrier layer-supporting substrate layer as described below can be obtained using a laminated film of a biodegradable polymer extruded on a paper substrate layer or a biaxial oriented film of a biodegradable polymer as a barrier layer-supporting substrate layer onto which a ceramic and/or a metal is vapor-deposited.

The barrier layer is preferably a single component vapor deposition layer comprising at least one selected from the group consisting of $SiO_x$, $Al_2O_3$ and Al, or a dual component vapor deposition layer comprising at least one combination of two components selected from the group consisting of $SiO_x/Al_2O_3$, $SiO_x/ZnO$, $SiO_x/CaO$, $SiO_x/B_2O_3$ and $CaO/Ca(OH)_2$.

Among those listed above, a metal aluminum (Al) is preferably vapor-deposited for the purpose of ensuring a shield from a light. When a paper substrate layer comprising a paper is provided, the substrate layer serves to shield almost all light, but a metal aluminum vapor deposition further ensures the light shielding.

When a metal detector is employed preliminarily to identify a contamination for example with a foreign body, then a single component vapor deposition layer consisting of $SiO_x$ and $Al_2O_3$, or a dual component vapor deposition layer consisting of at least one combination of two components selected from the group consisting of $SiO_x/Al_2O_3$, $SiO_x/ZnO$, $SiO_x/CaO$, $SiO_x/B_2O_3$ and $CaO/Ca(OH)_2$ is employed. The $SiO_x$ may for example be $SiO_2$, $SiO_{1.8}$, $SiO_{1.6}$ and the like. By means of a vapor deposition of such a ceramic, a product which has not conventionally been able to be subjected to a foreign body detection due to the metal vapor deposition can be examined using a metal detector.

When a ceramic has been vapor-deposited, a light shielding performance may be inferior to that when a metal aluminum is vapor-deposited, but a light shielding ability sufficient for protecting the content from a quality deterioration can be obtained by solid white printing over the entire surface as a background upon printing which is effective in shielding an UV light and a visible light.

The thickness of the barrier layer is preferably 1500 angstrom or less. A thickness more than 1500 angstrom affect a biodegradation adversely. More preferably, the thickness is 300 to 1500 angstrom. A thickness less than 300 angstrom poses a difficulty in accomplishing a uniform vapor deposition.

The barrier layer-supporting substrate layer comprises a biodegradable polymer.

Such a biodegradable polymer is preferably one having a heat resistance for the thermal hysteresis during a vapor deposition. Such a biodegradable polymer may for example be on having a certain heat resistance among aliphatic polyester resins which are chemically synthesized biodegradable polymers.

The aliphatic polyester resin may for example be a lactic acid-based polymer such as a homopolymer of a lactic acid, copolymer of a lactic acid with other aliphatic hydroxycarboxylic acid and the like.

The lactic acid may for example be L-lactic acid and D-lactic acid, and the aliphatic hydroxycarboxylic acid may for example be glycolic acid, 3-hydroxybutyric acid, 4-hydroxybutyric acid, 3-hydroxyvaleric acid, 4-hydroxyvaleric acid, 5-hydroxyvaleric acid, 6-hydroxycaproic acid and the like.

The polylactic acid-based polymer may for example be "LACTY" which is commercially available from SHIMADZU CORPORATION.

The barrier layer-supporting substrate layer, when providing a paper substrate layer outside the barrier layer-supporting substrate layer as described below, may for example be one formed by laminating a biodegradable polymer onto the paper substrate layer by means of an extrusion molding or one comprising a biaxial oriented film of a biodegradable polymer.

When the barrier layer-supporting substrate layer is one formed by laminating a biodegradable polymer onto the paper substrate layer by means of an extrusion molding, such a biodegradable polymer may for example be "LACTY" #9800 of an extrusion lamination grade which is commercially available from SHIMADZU CORPORATION.

When the barrier layer-supporting substrate layer is one comprising a biaxial oriented film of a biodegradable polymer, such a biodegradable polymer may for example be "LACTY" #9000 of a crystalline grade which is commercially available from SHIMADZU CORPORATION, "TERRAMAC" which is a biaxial oriented film comprising a polylactic acid-based polymer and commercially available form UNITIKA LTD., "Palgreen LC" which is a biaxial oriented film consisting of a polylactic acid-based polymer and commercially available form TOHCELLO CO., LTD.

When the barrier layer-supporting substrate layer is one consisting of a film, the elasticity of the film itself is increased and the film itself is imparted with an increased resistance to the tension exerted upon winding and rewinding a roll during a vapor deposition step since such a film is one formed by orienting a biodegradable polymer biaxially.

When a non-oriented film comprising a polylactic acid-based biodegradable polymer is subjected alone to a vapor deposition of a ceramic and/or a metal, the film could undergo a shrinkage due to the heat of the vapor deposition or the tension exerted upon winding and rewinding the roll, resulting in a damage on a vapor deposition layer once formed or a wrinkle which may lead to a difficulty in accomplishing a uniform vapor deposition. On the contrary, a barrier layer-supporting substrate layer which is one comprising a biaxial oriented film of a biodegradable polymer enables a uniform vapor deposition without deterioration or wrinkle formation even in a vapor deposition environment involving a complicatedly combined factors by which the vapor deposition is affected adversely, such as heat, tension and the like.

A satisfactory vapor deposition can be ensured also by further providing a paper substrate layer made of a paper outside the barrier layer-supporting substrate layer of the laminated film.

As a result of a stable vapor deposition, a stable barrier layer is formed which is sufficient for obtaining desired oxygen barrier property and water vapor barrier property.

More preferably, the barrier layer-supporting substrate layer comprises a biaxial oriented film of a biodegradable polymer with the melting point of 150° C. or higher.

For example when the melting point of the innermost sealant layer is 115° C., the actual seal bar temperature should be at least higher than 115° C., such as 130 to 150° C. In addition, a higher speed packaging of foods should have a shorter seal time, which requires a higher seal bar temperature, which may be as high as about 200° C.

Nevertheless, when the barrier layer-supporting substrate layer employs a biodegradable polymer with the melting point of 150° C. or higher and the sealant layer employs a biodegradable polymer with the melting point of 120° C. or below, the difference of the melting point between the sealant layer and the barrier layer-supporting substrate layer becomes 30° C. or more, which enables a bag making by melting the innermost sealant layer without undergoing any shrinkage of the outermost barrier layer-supporting substrate layer even at a high temperature of a high speed operation, resulting in the prevention of any reduction in the commercial value. Also in an actual packaging machine, the elongation of a packaging material itself due to the tensility to the film can also be prevented, resulting in the prevention of any skew seal or skew cut.

Also by means of providing a paper substrate layer comprising a paper as an outermost layer of the laminated film described below, the heat shrinkage of a package bag can be prevented.

The thickness of the barrier layer-supporting substrate layer is preferably 5 to 20 μm. A thickness less than 5 μm allows an effect of the vapor deposition heat on the tension upon film sending and rewinding a roll to be evident, resulting in difficulty in accomplishing a stable vapor deposition. On the other hand, a thickness more than 20 μm gives an increased overall thickness, which leads to an increased overall weight, which is problematic also in view of a container recycling law. Moreover, an increased overall thickness allows a pin hole to be formed readily at the site of the longitudinal seal.

A thickness of 3 to 15 μm is more preferred.

The laminated film preferably furthermore has a paper substrate layer comprising a paper outside the barrier layer-supporting substrate layer.

Such a paper is not limited particularly and may be selected as desired depending on an intended wrapping function or print pattern, and may for example be a thin paper, high quality paper, kraft paper, coat paper, cellulose-based unwoven fabric, cellulose-based film and the like. Among those listed above, a thin paper is preferred in view of the production cost and the light-weight packaging.

The paper substrate layer serves to protect the barrier layer-supporting substrate layer from the heat or tension exerted during a vapor deposition, serves as a print substrate for conducting a surface printing, and, due to its high heat resistance, also serves to prevent the shrinkage of a packaging material due to the heat exerted upon making a bag in an actual packaging machine. Moreover, the paper substrate layer also has an ability of promoting the hydrolysis of a biodegradable polymer such as a polylactic acid in the barrier layer-supporting substrate layer, since it has a water-retaining property.

The thickness of the paper substrate layer is not limited particularly as long as it poses no friction against the film feed upon making bags by a packaging machine, and is preferably 15 to 100 g/m$^2$ when converted into a basis weight. A thickness less than 15 g/m$^2$ makes it difficult to ensure a stable quality due to the difficulty in making papers themselves. On the other hand, a paper substrate layer having a thickness more than 100 g/m$^2$ serves as a heat insulant because of the difficulty in transmitting the heat to melt the innermost sealant.

Figure 3:
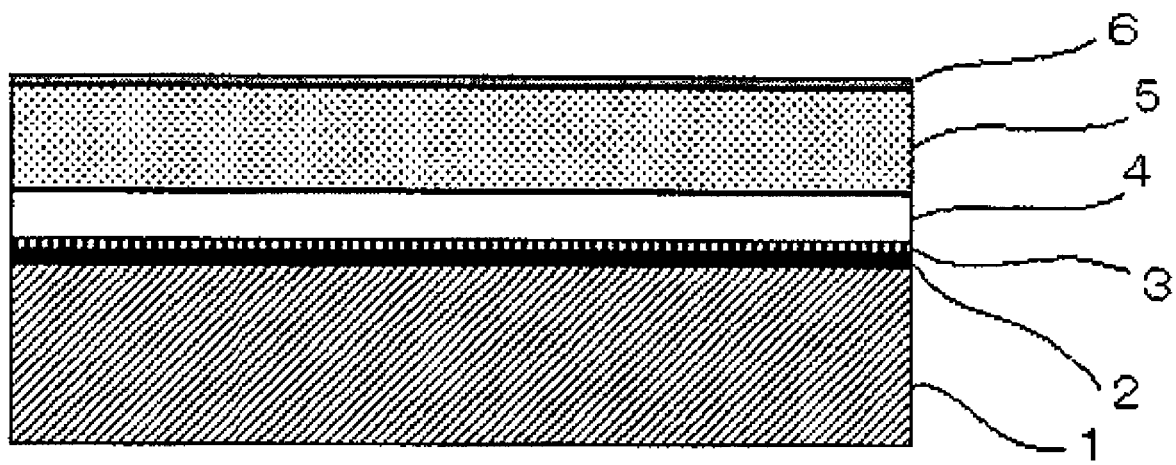
FIG. 3 shows the laminate structure of a roll of a biodegradable bag for packing a food according to the present invention.

When the laminated film has a paper substrate layer comprising a paper, a biodegradable bag for packing a food of the present invention is preferably one obtainable by extruding a biodegradable polymer onto the paper substrate layer to effect a lamination whereby forming the barrier layer-supporting substrate layer, followed by effecting a vapor deposition of a ceramic and/or a metal onto the barrier layer-supporting substrate layer to form the barrier layer, followed by laminating the sealant layer via a biodegradable adhesive onto the barrier layer, or one obtainable by laminating a biaxial oriented film of a biodegradable polymer via a biodegradable adhesive onto the paper substrate layer whereby forming the barrier layer-supporting substrate layer, followed by effecting a vapor deposition of a ceramic and/or a metal onto the barrier layer-supporting substrate layer to form the barrier layer, followed by laminating the sealant layer via a biodegradable adhesive onto the barrier layer. Such a laminate structure is shown in FIG. 3. A biodegradable bag for packing a food thus obtained is biodegradable.

The biodegradable adhesive may for example be one obtained by dissolving an aliphatic polyester resin or a biodegradable polymer such as a polylactic acid-based polymer as main ingredients in a solvent such as toluene, methyl ethyl ketone, chloroform and the like.

A biodegradable bag for packing a food according to the present invention may further comprise a printed layer comprising a biodegradable ink on the surface of the substrate layer side. By using as a biodegradable printing ink, the biodegradablity is not affected adversely.

The biodegradable ink is not limited particularly, and may for example be a regenerated vegetable oil ink, soybean oil ink and the like. The soybean oil ink is obtained by replacing all or a part of a petroleum-based solvent and a drying oil in a conventional ink with a soybean oil, and is advantageous since it allows the ink to be readily separated from the paper and to be degraded in a soil. The soybean oil ink may be available commercially for example from TOYO INK MFG. CO., LTD. or TOPPAN PRINTING CO., LTD.

When the barrier layer is formed by means of a transparent vapor deposition using a ceramic and the like, then a print-protecting layer consisting of a biodegradable polymer is further provided between the sealant layer and the barrier layer of the laminated film to conduct the printing whereby forming a printed layer on the print-protecting layer, thus accomplishing a reverse printing. When the barrier layer of a vapor-deposited ceramic is printed directly, the barrier layer may undergo a microcracking upon printing, which may lead to a reduced barrier performance.

The biodegradable polymer may for example be a polyvinyl alcohol.

Such a polyvinyl alcohol may for example be any of those which are commercially available such as POVAL manufactured by KURARAY CO., LTD., GOHSENOL manufactured by NIPPON SYNTHETIC CHEMICAL INDUSTRY CO., LTD., Dolon Va. manufactured by AICELLO CHEMICAL CO., LTD. and the like.

The thickness of the print-protecting layer is preferably 0.02 to 0.2 µm. A thickness less than 0.02 µm may lead to a deterioration of a vapor deposition layer due to a friction, or may affect the close contact with the printing adversely. On the other hand, a thickness more than 0.2 µm may lead to a poor ink contact or drying, which is disadvantageous in an actual production.

Nevertheless, it is possible to print directly on a barrier layer if the barrier layer is formed by a dual component vapor deposition and the printing is conducted under the condition involving a tension as low as about 2% or less elongation.

The ink employed in the printing is preferably a biodegradable ink similar to those described above.

Figure 7:
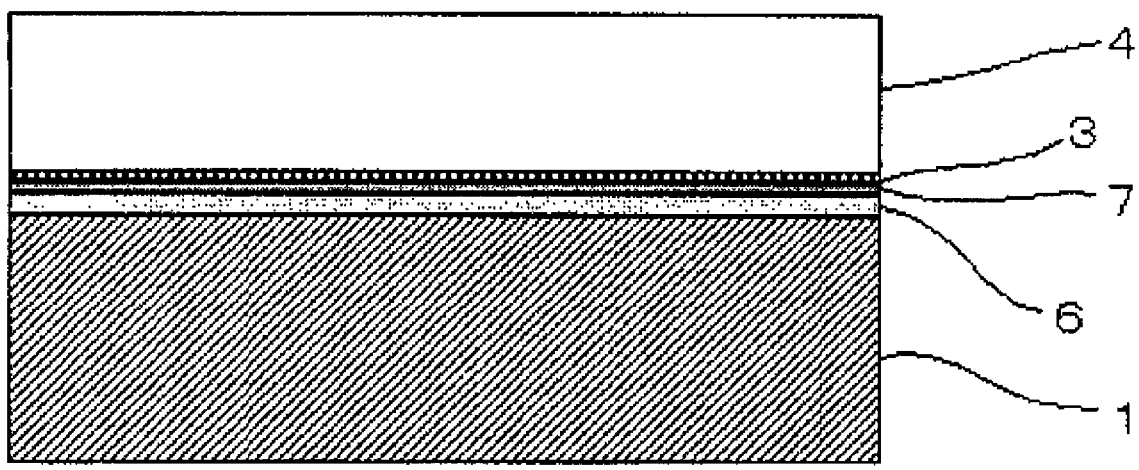
FIG. 7 shows the laminate structure of a roll of a biodegradable bag for packing a food according to the present invention.

When the laminated film has a print-protecting layer, a biodegradable bag for packing a food according to the present invention is obtainable preferably by effecting a vapor deposition of a ceramic onto the barrier layer-supporting substrate layer comprising a biaxial oriented film of a biodegradable polymer to form the barrier layer, followed by molding the print-protecting layer onto the barrier layer, followed by forming a printed layer onto the print-protecting layer, followed by laminating the sealant layer via a biodegradable adhesive onto the printed layer. Such a laminate structure is shown in FIG. 7.

A biodegradable bag for packing a food according to the present invention may further comprise an adhesive layer comprising a biodegradable adhesive between respective layers. By providing the biodegradable adhesive between the respective layers, the adhesiveness between the respective layers can further be enhanced without affecting the biodegradabiliry adversely.

As described above, the present invention allows a high function bag for packing a food to be obtained which is biodegradable, give no burden on a global environment, has an oxygen barrier property and a water vapor barrier property, and can withstand a high temperature sealing upon making bags at a high speed.

While the applications of a biodegradable bag for packing a food according to the present invention is not limited particularly, it is employed preferably for packaging a food which is required to have an oxygen barrier property and a water vapor barrier property, especially a snack food.

The adsorption of the flavors of a snack food can be prevented especially when using a polyester-based resin in the internal surface layer which is brought into contact with the snack food in the bag.

Figure 4:
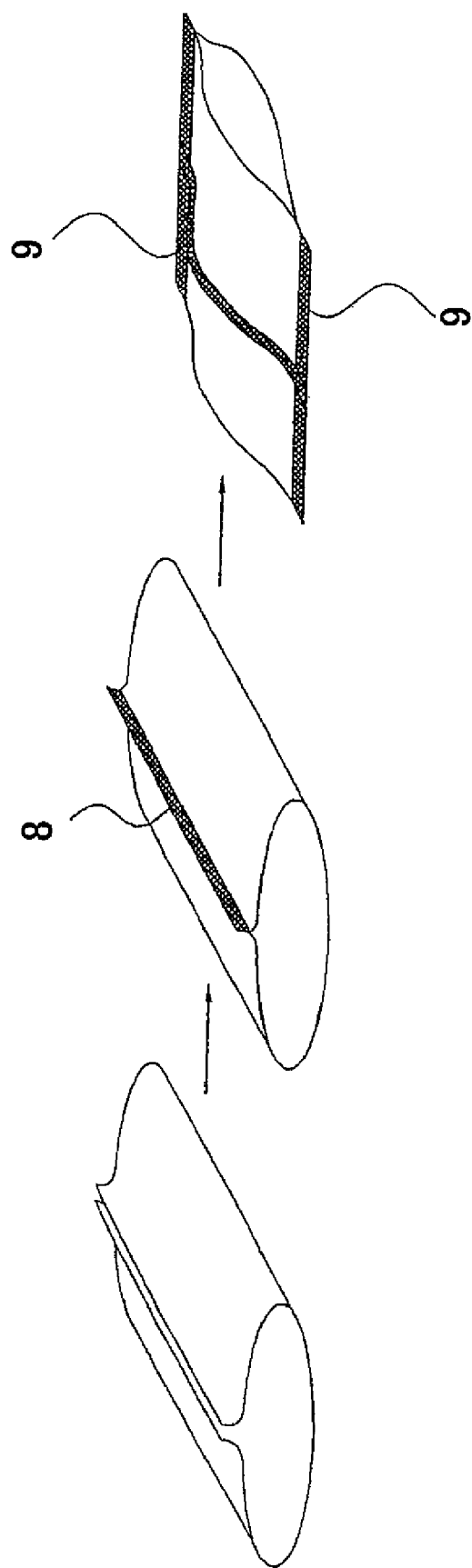
FIG. 4 shows a schematic view of a fin seal of a pillow package.

While the method for packing a food with a biodegradable bag for packing a food according to the present invention is not limited particularly, it is preferably be a method comprising a back seal step in which the laminated film is made tubular with the sealant layer being inside to bring the both back sides into contact and heat-sealed with each other, a food introducing step in which a food is introduced to the inside of the tube of the laminated film, and an end seal step in which the both ends of the tube of the laminated film containing the food are sealed (sealing as shown in FIG. 4).

The method described above is also one of the aspects of the present invention.

BEST MODE FOR CARRYING OUT THE INVENTION

The invention is further described in the following examples, which are not intended to restrict the invention.

Example 1

A 15 µm aliphatic polyester resin polybutylene succinate (BIONOLLE #1001m, manufactured by SHOWA HIGH-POLYMER CO., LTD.) was dry-laminated using a biodegradable adhesive (mixture of several aliphatic polyester resins dissolved in methyl ethyl ketone) onto a thin paper with a basis weight of 20 g/m$^2$ (about 20 µm in thickness) which had been laminated with a 10 µm biodegradable polylactic acid LACTY grade #9800 commercially available from SHIMADZU CORPORATION by means of a melt extrusion and which had then been vapor-deposited with $Al_2O_3$ on its polylactic acid side, whereby obtaining a film roll for a snack food bag.

The resultant film roll and a conventional film roll comprising OPP (18 µm)/PE (13 µm)/PET (12 µm)/Al vapor deposition (500 angstrom)/PE (13 µm)/CPP (20 µm) were examined for the heat seal temperature property, $O_2$ permeability and $H_2O$ permeability, which were then compared. The results are shown in FIG. 1 and Table 1.

The measurement of the $O_2$ permeability and $H_2O$ permeability were conducted under the conditions described below.

$O_2$ permeability: OX-TRAN2/20MH, manufactured by MOCON, INC.; 23° C., Dry $H_2O$ permeability: PERMATRAN W3/31MG, manufactured by MOCON, INC.; 37° C., 90% RH

TABLE 1

| | | Evaluation item | |
|---|---|---|---|
| | | $O_2$ permeability ($ml/m^2 \cdot D \cdot Atm$) | $H_2O$ permeability ($g/m^2 \cdot D$) |
| Film roll | Product of the invention | 1.6 | 1.8 |
| | Conventional product | 1.7 | 1.5 |

Subsequently, each of these rolls was subjected to an actual machine test using an actual snack food packaging machine (APEX packaging machine, manufactured by ISHIDA CO., LTD.). The results are shown in Table 2.

"APEX packaging machine" manufactured by ISHIDA is disclosed in U.S. Pat. No. 5,347,795.

TABLE 2

| | | Evaluation item | |
|---|---|---|---|
| | | Seal bar set temperature (° C.) | Packaging speed (BMP) |
| Film roll | Product of the invention | 140 | 140 |
| | Conventional product | 170 | 80 |

As evident from FIG. 1, the heat seal temperature curve of the inventive film began to rise at about 120° C., and allowed the heat seal step to be accomplished at a temperature lower by 20 to 30° C. when compared with a conventional film. As a result, the packaging speed was increased as shown in Table 2, enabling a 1.7-fold faster packaging process when compared with the conventional film. Thus, the conventional film could pack only 80 bags per minute, but the inventive film could pack 140 bags per minute. Also since the use of a paper in the outermost layer resulted in no seal bar-induced heat deterioration or shrinkage of the packaging material upon sealing at a high temperature, a further higher speed operation will be possible.

Especially in the case of the machine for packing a snack food among the food to be packed, as shown in FIG. 4, a snack food packaging film is made tubular with a 15 μm BIONOLLE #1001 film (manufactured by SHOWA HIGHPOLYMER CO., LTD.) (a sealant layer consisting of a biodegradable polymer having a melting point of 120° C. or less) being inside and the meeting edges are heat-sealed in a back-to-back manner (back seal). Then, a snack food is charged into the inside of the tubular snack food bag. Subsequently, the both ends of the tubular snack food bag are heat-sealed (end seals). As a result, the snack food is packed in the snack food bag.

The package material thus obtained was buried in a soil (in ISHIDA CO., LTD. SIGA PLANT, RITTO CITY, SHIGA PREFECTURE) at a depth of about 10 cm to evaluate the biodegradability, and the results indicated that a half was degraded at the time of about 3 months, and the original shape was lost at the time of 12 months.

Example 2

A 15 μm aliphatic polyester resin polybutylene succinate (BIONOLLE #1001m, manufactured by SHOWA HIGH-POLYMER CO., LTD., melting point: 114° C.) was laminated using a biodegradable adhesive employed in EXAMPLE 1 with a thin paper with a basis weight of 20 $g/m^2$ (about 20 μm in thickness) which had been laminated using a biodegradable adhesive employed in EXAMPLE 1 with a biaxial oriented (20 μm in thickness) LACTY #9000 (melting point of 150 to 170° C.) from SHIMADZU CORPORATION with its biaxial oriented film side being subjected to a vapor deposition with $SiO_{1.8}$, whereby obtaining a film roll for a snack food bag.

The resultant film roll was examined for the heat seal temperature property, $O_2$ permeability and $H_2O$ permeability. The results are shown in FIG. 2 and Table 3.

TABLE 3

| | | Evaluation item | |
|---|---|---|---|
| | | $O_2$ permeability ($ml/m^2 \cdot D \cdot Atm$) | $H_2O$ permeability ($g/m^2 \cdot D$) |
| Film roll | Product of the invention | 1.8 | 2.0 |

Figure 2:
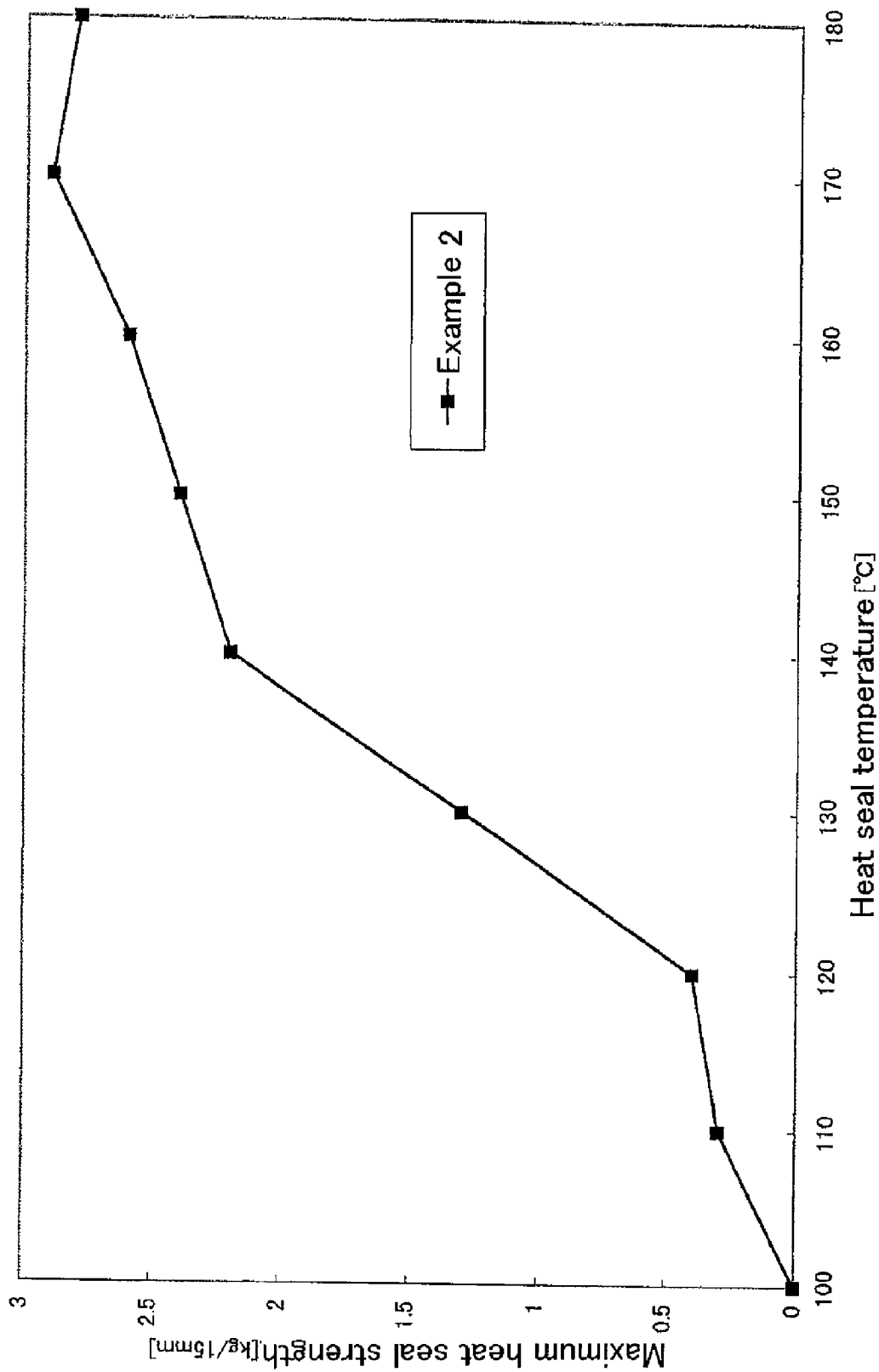
FIG. 2 shows the heat seal temperature property of the roll for a snack food bag in Example 2 (product of the invention).

The heat seal temperature property shown in FIG. 2 appeared as a curve which was almost identical to that of the heat seal temperature property of EXAMPLE 1 shown in FIG. 1, since the package material structure was identical to that of EXAMPLE 1 and the total thickness and the sealant layer were completely similar. Accordingly, the packaging speed of the actual packaging machine is assumed to be similar to the speed in EXAMPLE 1.

Example 3

The surface of the paper of the roll film of the present invention obtained in EXAMPLE 1 was printed with a soybean ink manufactured by TOYO INK MFG. CO., LTD. which is a biodegradable ink.

A piece of this roll film was buried in the soil to be subjected to the biodegradability test similarly to EXAMPLE 1, and the results indicated a satisfactory biodegradability.

Example 4

A 15 μm aliphatic polyester resin polybutylene succinate (BIONOLLE #1001m, manufactured by SHOWA HIGH-POLYMER CO., LTD., melting point: 114° C.) was laminated using a biodegradable adhesive employed in EXAMPLE 1 with a thin paper with a basis weight of 20 $g/m^2$ (about 20 μm in thickness) which had been laminated using a biodegradable adhesive employed in EXAMPLE 1 with a polylactic acid-derived biaxial oriented TERRAMAC (15 μm in thickness, melting point: 170° C.) from UNITIKA LTD. with its biaxial oriented film side being subjected to a vapor deposition with $Al_2O_3$, and then the paper surface was printed with the biodegradable ink similar to that in EXAMPLE 3, whereby obtaining a film roll for a snack food bag.

The film roll was examined for the heat seal temperature property, $O_2$ permeability and $H_2O$ permeability, and the results are favorably compared with those in EXAMPLES 1 and 2. A piece of this roll film was buried in the soil to be subjected to the biodegradability test similarly to EXAMPLE 1, and the results indicated a satisfactory biodegradability.

Example 5

An inventive roll film obtained in EXAMPLE 1 and a conventional roll film were subjected to a test in which a snack food (potato chips) immediately after production was filled and packaged. The packaging machine employed was "APEX packaging machine" manufactured by ISHIDA CO., LTD., and an $N_2$ purge was also performed.

The package bags thus obtained were placed in a thermostat chamber to perform a 40° C. 1-month storage test, after which an organoleptic evaluation was conducted by 10 panelists. The results are shown in Table 4. Each figure in the table is the mean of 10 panelists.

TABLE 4

| | | Evaluation item | |
| --- | --- | --- | --- |
| | | Flavor on unsealing | Taste/Flavor |
| Film roll | Product of the invention | 4.6 | 4.8 |
| | Conventional product | 3.5 | 4.3 |

Note-1) The results were judged on a 0 to 5 scale, with the score immediately after the production being 5.0 and the palatable limit being 3.0, and the samples having 3.0 or higher scores were judged to be valuable commercially. Note-2) The flavor at the instance of breaking the bag was regarded as an Flavor on unsealing, while the taste and the flavor when eating with relish the potato chips was regarded as a Taste/Flavor.

As evident from Table 4, the inventive sample exhibited excellent Flavor on unsealing as well as taste and flavor upon eating with relish, when compared with the conventional sample. These findings are due to a polyester-based sealant undergoing less flavor adsorption being used as the innermost layer of the inventive laminate.

Example 6

A 15 μm aliphatic polyester resin polybutylene succinate (BIONOLLE #1001m, manufactured by SHOWA HIGH-POLYMER CO., LTD.) was dry-laminated using a biodegradable adhesive (mixture of several aliphatic polyester resins dissolved in methyl ethyl ketone) onto a 15 μm polylactic acid-derived biaxial oriented form (TERRAMAC hard type, manufactured by UNITIKA LTD.) which had been subjected to a vapor deposition with $Al_2O_3$ to the thickness of 500 angstrom and then painted with a 4 weight % solution of a polyvinyl alcohol (PVA205, manufactured by KURARAY CO., LTD.) in water:alcohol (1:1) to the solid thickness of 0.1 μm and then further printed with a soybean oil ink by TOYO INK MFG. CO., LTD which was a biodegradable ink, whereby obtaining a film roll for a snack food bag.

Figure 5:
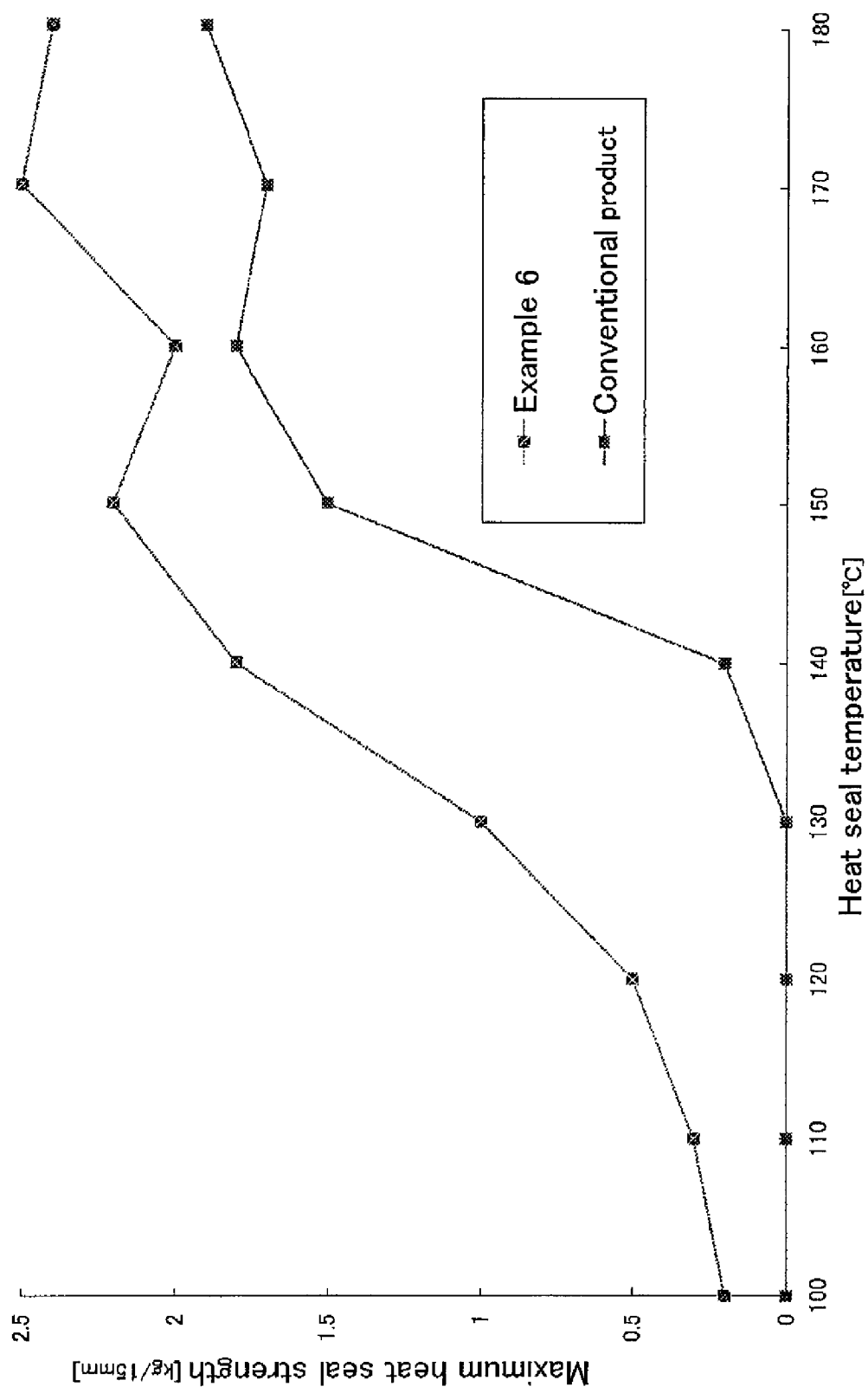
FIG. 5 shows the heat seal temperature property of the roll for a snack food bag in Example 6 (product of the invention).

The resultant film roll and a conventional film roll comprising OPP (18 μm)/PE (13 μm)/PET (12 μm)/Al vapor deposition (500 angstrom)/PE (13 μm)/PP (20 μm) were examined for the heat seal temperature property, $O_2$ permeability and $H_2O$ permeability, which were then compared. The results are shown in FIG. 5 and Table 5.

TABLE 5

| | | Evaluation item | |
| --- | --- | --- | --- |
| | | $O_2$ permeability (ml/m² · D · Atm) | $H_2O$ permeability (g/m² · D) |
| Film roll | Product of the invention | 2.0 | 2.2 |
| | Conventional product | 1.7 | 1.5 |

Subsequently, each of these rolls was subjected to an actual machine test using an actual snack food packaging machine (APEX packaging machine, manufactured by ISHIDA CO., LTD.). The results are shown in Table 6.

TABLE 6

| | | Evaluation item | |
| --- | --- | --- | --- |
| | | Seal bar set temperature (° C.) | Packaging speed (BMP) |
| Film roll | Product of the invention | 140 | 140 |
| | Conventional product | 170 | 80 |

As evident from FIG. 5, the heat seal temperature curve of the inventive film began to rise at about 100° C., and allowed the heat seal step to be accomplished at a temperature lower by 30 to 40° C. when compared with a conventional film. As a result, the packaging speed was increased as shown in Table 6, enabling a 1.7-fold faster packaging process when compared with the conventional film. Thus, the conventional film could pack only 80 bags per minute, but the inventive film could pack 140 bags per minute. An attempt was also made to set the seal bar temperature at 180° C. and the packaging speed was increased to 160 cycles to conduct the packaging. As a result, the inventive sample in this EXAMPLE underwent a shrinkage on the surface brought into contact with a seal bar and was not successful in exhibiting a satisfactory performance, but the inventive sample in EXAMPLE 1 exhibited a satisfactory performance. Such findings may be due to the paper substrate layer on the surface.

The package material thus obtained was buried in a soil (in ISHIDA CO., LTD. SIGA PLANT, RITTO CITY, SHIGA PREFECTURE) at a depth of about 10 cm to evaluate the biodegradability, and the results indicated that a half was degraded at the time of about 6 months, and the original shape was lost at the time of 12 months.

Example 7

A 20 μm in thickness biaxial oriented film consisting of a polylactic acid which is a biodegradable polymer (TERRAMAC hard type, manufactured by UNITIKA LTD.) was subjected to a vapor deposition with $SiO_{1.8}$ to the thickness of 800 angstrom, and the vapor deposition side was extrusion-laminated with an aliphatic polyester resin polybutylene succinate (BIONOLLE #1001m, manufactured by SHOWA HIGH-POLYMER CO., LTD.) to the thickness of 10 μm, whereby obtaining a film roll for a snack food bag having a total thickness of about 35 μm.

Figure 6:
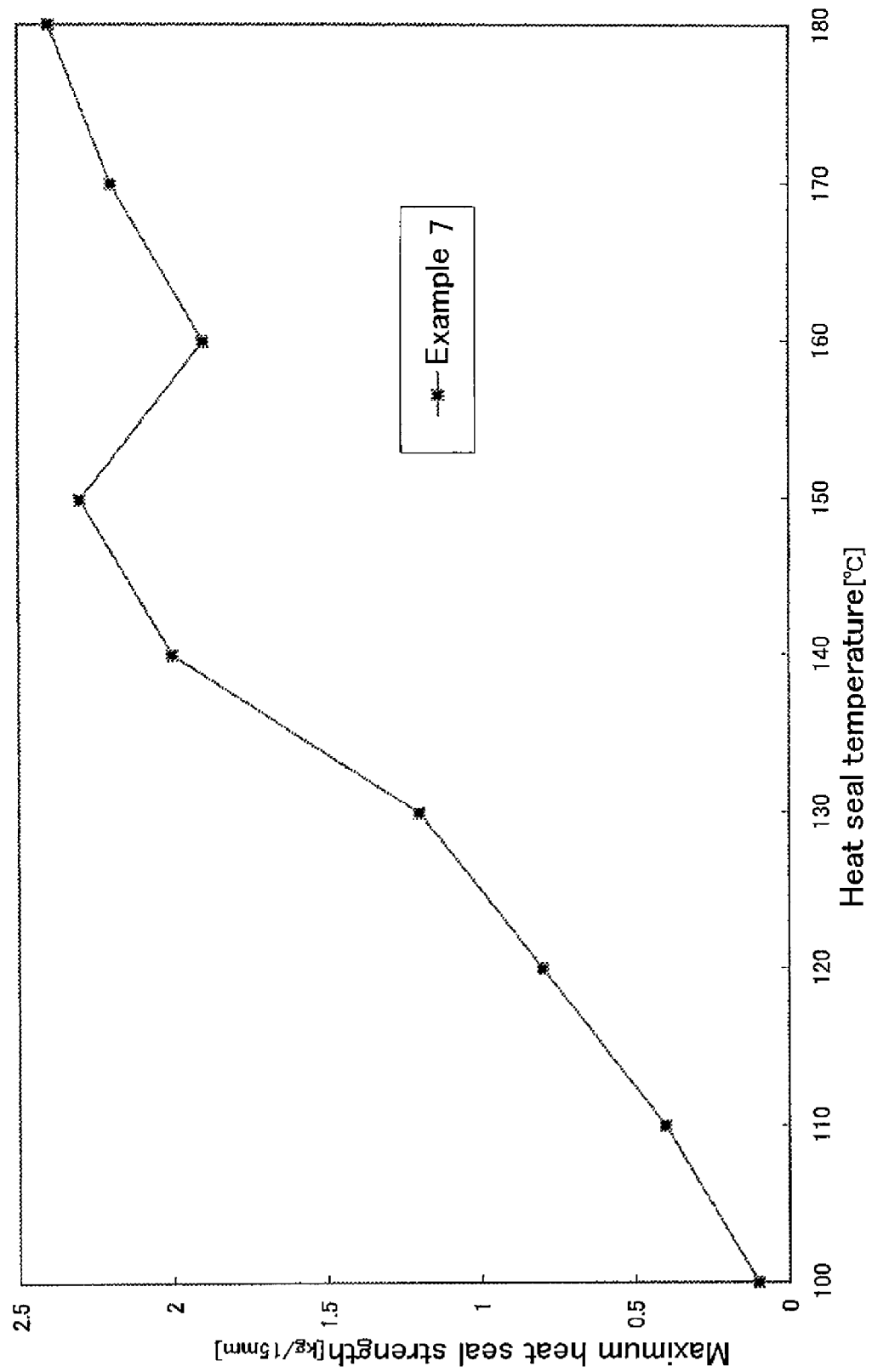
FIG. 6 shows the heat seal temperature property of the roll for a snack food bag in Example 7 (product of the invention) and a conventional roll film (conventional product).

The resultant film roll was examined for the heat seal temperature property, $O_2$ permeability and $H_2O$ permeability. The results are shown in FIG. 6 and Table 7.

TABLE 7

| | | Evaluation item | |
| --- | --- | --- | --- |
| | | $O_2$ permeability (ml/m² · D · Atm) | $H_2O$ permeability (g/m² · D) |
| Film roll | Product of the invention | 1.8 | 2.0 |

Example 8

An inventive roll film obtained in EXAMPLE 6 and a conventional roll film were subjected to a test in which a snack food (potato chips) immediately after production was filled and packaged. The packaging machine employed was "APEX packaging machine" manufactured by ISHIDA CO., LTD., and an $N_2$ purge was also performed.

The package bags thus obtained were placed in a thermostat chamber to perform a 40° C. 1-month storage test, after which an organoleptic evaluation was conducted by 10 panelists. The results are shown in Table 8. Each figure in the table is the mean of 10 panelists.

TABLE 8

|  |  | Evaluation item | |
|---|---|---|---|
|  |  | Flavor on unsealing | Taste/Flavor |
| Film roll | Product of the invention | 4.6 | 4.8 |
|  | Conventional product | 3.5 | 4.3 |

Note-1) The results were judged as one of 5 degrees, with the score immediately after the production being 5.0 and the palatable limit being 3.0, and the samples having 3.0 or higher scores were judged to be valuable commercially. Note-2) The flavor at the instance of breaking the bag was regarded as an Flavor on unsealing, while the taste and the flavor when eating the potato chips was regarded as a Taste/Flavor.

As evident from Table 8, the inventive sample exhibited excellent Flavor on unsealing as well as taste and flavor upon eating, when compared with the conventional sample. These findings are due to a polyester-based sealant undergoing less flavor adsorption being used as the innermost layer of the inventive laminate.

INDUSTRIAL APPLICABILITY

According to the present invention, an automatic bag making using a packaging machine can be conducted at a higher speed, and a biodegradable bag for packing a food capable of being degraded spontaneously when buried in a soil and like after disposal can be obtained. Thus, by altering the structure of bag materials, while imparting the bag with a barrier function, from a conventional composite structure consisting of different resins which are difficult to be recycled as materials and which pose problems upon disposal such as OPP (or PET)/vapor deposition layer/polyolefin and the like to a novel structure such as a biodegradable polymer sealant layer/biodegradable adhesive layer/ceramic or metal vapor deposition layer/biodegradable polymer barrier layer-supporting substrate layer/paper/biodegradable ink-bearing printing layer, or a biodegradable polymer sealant layer/(biodegradable adhesive layer)/biodegradable polymer-derived biodegradable ink-bearing printing layer/biodegradable polymer print-protecting layer/oxygen or water vapor barrier layer/biodegradable polymer-derived biaxial oriented barrier layer-supporting substrate layer, a biodegradable food package bag can be obtained. Furthermore, a biodegradable bag for packing a food according to the present invention can reduce burning calories upon an incineration disposal after use when compared with a conventional package material structure employing polyolefin resins generating high burning calories as major constituents, whereby preventing any damage of the incineration furnace.

The invention claimed is:

1. A method for producing a biodegradable bag for packing a food, comprising:
   step 1: laminating a barrier layer-supporting substrate layer comprising a biodegradable polymer with a melting point of 150° C. or higher onto a paper substrate layer comprising a paper to obtain a laminated film having a structure of a paper substrate layer/barrier layer-supporting substrate layer;
   step 2: vapor-depositing a ceramic and/or a metal and thereby forming a barrier layer having an oxygen barrier property and a water barrier property onto said barrier layer-supporting substrate layer of the laminated film having the structure of said paper substrate layer/barrier layer-supporting substrate layer to obtain a laminated film having a structure of a paper substrate layer/barrier layer-supporting substrate layer/barrier layer;
   step 3: laminating a sealant layer comprising a biodegradable polymer with a melting point of 120° C. or below onto the barrier layer having the structure of said paper substrate layer/barrier layer-supporting substrate layer/barrier layer to obtain a laminated film having a structure of a paper substrate layer/barrier layer-supporting substrate layer/barrier layer/sealant layer;
   step 4: making tubular said laminated film having the structure of said paper substrate layer/barrier layer-supporting substrate layer/barrier layer/sealant layer with said sealant layer being inside to bring both back sides into contact with each other, and heat-sealing said back side with each other;
   step 5: introducing a food to the inside of said tubular laminated film; and
   step 6: heat-sealing both ends of said tubular laminated film containing the food.

2. The method for producing a biodegradable bag for packing a food according to claim 1, wherein the barrier layer-supporting substrate layer is a biaxial oriented film of the biodegradable polymer with a melting point of 150° C. or higher.

3. The method for producing a biodegradable bag for packing a food according to claim 1, wherein in Step 1, the barrier layer-supporting substrate layer is laminated by extrusion-molding a biodegradable polymer with a melting point of 150° C. or higher onto the paper substrate layer.

4. The method for producing a biodegradable bag for packing a food according to claim 1, wherein the sealant layer is a non-oriented film layer comprising the biodegradable polymer with a melting point of 120° C. or below.

5. The method for producing a biodegradable bag for packing a food according to claim 4, wherein in step 3, the sealant layer is laminated by extrusion-molding the biodegradable polymer with a melting point of 120° C. or below onto the barrier layer of the laminated film having the structure of the paper substrate layer/barrier layer-supporting substrate layer/barrier layer.

6. The method for producing a biodegradable bag for packing a food according to claim 1, wherein in step 3, the sealant layer comprising the biodegradable polymer with a melting point of 120° C. or below is laminated via a biodegradable adhesive onto the barrier layer of the laminated film having the structure of the paper substrate layer/barrier layer-supporting substrate layer/barrier layer.

7. The method for producing a biodegradable bag for packing a food according to claim 1, wherein the biodegradable polymer with a melting point of 150° C. or higher and the biodegradable polymer with a melting point of 120° C. or below are aliphatic polyester resins.

8. The method for producing a biodegradable bag for packing a food according to claim 1, wherein the food is a snack food.

* * * * *